(12) United States Patent
Caporale et al.

(10) Patent No.: US 9,755,411 B2
(45) Date of Patent: Sep. 5, 2017

(54) ELECTRICAL RECEPTACLE OUTLET DRAFT SHIELD COVER

(71) Applicants: Bill Caporale, Massapequa Park, NY (US); Thomas Mavroudis, Massapequa Park, NY (US)

(72) Inventors: Bill Caporale, Massapequa Park, NY (US); Thomas Mavroudis, Massapequa Park, NY (US)

(73) Assignees: William Caporale, Massapequa Park, NY (US); Thomas Mavroudis, Massapequa Park, NY (US)

( * ) Notice: Subject to any disclaimer, the term of this patent is extended or adjusted under 35 U.S.C. 154(b) by 0 days.

(21) Appl. No.: 14/937,430

(22) Filed: Nov. 10, 2015

(65) Prior Publication Data

US 2017/0133829 A1    May 11, 2017

(51) Int. Cl.
| | |
|---|---|
| *H02G 3/14* | (2006.01) |
| *H02G 3/08* | (2006.01) |
| *H01B 3/44* | (2006.01) |
| *H01B 3/42* | (2006.01) |
| *H01R 13/52* | (2006.01) |
| *H01R 24/78* | (2011.01) |

(52) U.S. Cl.
CPC .............. *H02G 3/081* (2013.01); *H01B 3/42* (2013.01); *H01B 3/443* (2013.01); *H01R 13/5213* (2013.01); *H02G 3/14* (2013.01); *H01R 24/78* (2013.01)

(58) Field of Classification Search
CPC ............ H02G 3/14; H02G 3/08; H02G 3/081; H02G 3/18; H02G 3/088; H01B 3/42; H01B 3/443; H01R 13/5213; H01R 13/73; H01R 13/5219; H01R 13/527; H01R 13/52

USPC ... 174/66, 67, 50, 53, 480, 481, 17 CT, 660; 220/241, 242, 3.3, 3.8; D13/156, 177; 439/536

See application file for complete search history.

(56) References Cited

U.S. PATENT DOCUMENTS

| | | | | | |
|---|---|---|---|---|---|
| 4,163,137 | A | * | 7/1979 | Close, Jr. | H02G 3/123 174/66 |
| 4,293,173 | A | * | 10/1981 | Tricca | H01R 13/443 174/67 |
| 4,952,755 | A | * | 8/1990 | Engel | H01R 13/447 174/67 |
| 5,712,450 | A | * | 1/1998 | Chan | H02G 3/088 174/66 |
| 5,837,937 | A | * | 11/1998 | Reese | H02G 3/14 174/66 |
| 6,521,834 | B1 | * | 2/2003 | Dykhoff | H02G 3/14 174/66 |
| 6,977,342 | B1 | * | 12/2005 | Maltby | H02G 3/14 174/66 |
| 7,674,977 | B1 | * | 3/2010 | Constantino | H02G 3/14 174/53 |

(Continued)

*Primary Examiner* — Angel R Estrada
(74) *Attorney, Agent, or Firm* — Limin Wen

(57) ABSTRACT

The present invention relates generally to an electrical receptacle and face plate outlet covering as an energy saving device by blocking any and all air infiltration from the receptacle area. The cover is made from recyclable plastic and is rectangular in shape, with insulating foam around the edges of the cover. There are sets of three cut-outs or Rule Steel Die Cut slits in the cover, which are matched and accommodated with a normal electrical plug or a plug lock to be plugged into the receptacle outlet.

1 Claim, 5 Drawing Sheets

(56) References Cited

U.S. PATENT DOCUMENTS

| | | | |
|---|---|---|---|
| 8,222,522 B1* | 7/2012 | Easthouse | H02G 3/088 |
| | | | 174/66 |
| 9,236,722 B1* | 1/2016 | Klein | H02G 3/081 |
| 9,397,490 B1* | 7/2016 | Klein | H02G 3/081 |
| 9,496,695 B2* | 11/2016 | Battaglia | H02G 3/088 |

* cited by examiner

1  Fig. 5 A  1'

ELECTRICAL RECEPTACLE OUTLET DRAFT SHIELD COVER

FIELD OF THE INVENTION

This invention relates generally to an electrical outlet cover as an energy saving device by blocking any and all air infiltration from the receptacle area without the need to remove the wall plate and expose oneself to live electrical current. The electrical receptacle outlet cover is made from plastic and is rectangular or square in shape (depending on the type of electrical outlet) with insulating foam around the edges of the cover that creates an air tight seal. There are sets of three (3) cut-outs or Rule Steel Die Cut slits in the cover, which are matched and accommodate a normal two prong and three prongs (Grounded) electrical plug or plug lock in the case there were no plug is used an outlet cover plug lock is supplied which is to be plugged into the receptacle outlet to hold the outlet cover in place in an airtight configuration as the force of the electrical plug seals the cover seal against the adjacent outlet mounting surface. Another use of this product is for electrical outlet leakage testing during an Energy Audit.

BACKGROUND OF THE INVENTION

Heat is lost in homes and other buildings through air infiltration. When discussing air infiltration and energy savings, it is actually a substantial portion of treated air in homes and buildings that is often wasted. Treated air is air that is heated or cooled by various heating units or air conditioners used in homes and buildings, and air that is humidified or dehumidified by humidifiers or dehumidifiers. Due to the ever increasing cost of energy, this substantial portion of treated air which is wasted is having a larger and larger economic impact on homeowners and building owners. An important source of heating energy loss in conventional building structures is air infiltration through gaps and cracks in walls and in construction surrounding windows and doors. It has been empirically established that approximately 6% of all air infiltration in residential buildings is attributable to losses through electrical outlets installed on the inside of exterior walls. The main route for infiltration through the insulated stud cavity area of exterior walls is through electrical outlets. Electrical outlets, including the electrical boxes in which they are disposed, comprise a gap in the insulation system of conventional buildings through which cold air is readily admitted into the structure and heated air is readily lost from the building. Furthermore, these outlets form a path for large heat conduction losses through the wall and a means through which moisture may permeate into wall insulation materials. There is a logical need to improve the thermal efficiency of residential buildings and save energy through such electrical outlets.

According to the U.S. Department of Energy Office of Energy Efficiency and Renewable Energy, up to 40% of a home's heat loss can result from air infiltration and a major offender is electrical outlets that are inside of exterior walls. These outlets can simply be described as holes in these walls where there is a sizable gap in the insulation through which heated air is readily lost at the same time as cold air is infiltrating the same opening. These gaps can be found in insulation at the top plate of the wall and around the electric box where the outlet is mounted. These are hard area to insulate become raceways for cold air and warm air to transition. This is a year round problem as during the winter the heated air escapes while the cold outside air enters and during the summer the cold air-conditioned air escapes while the hot summer air invades people's homes.

Analysis by a NYSERDA sponsored study has demonstrated that the heating energy penalty due to air infiltration is an order of magnitude greater than the penalty due to thermal bridging as in R factor.

The present invention provides a simple, safe and affordable outlet cover to prevent heat energy losses by air infiltration through electrical outlets.

SUMMARY OF THE INVENTION

In the winter months the cold air from the outside infiltrates into the home through the outside walls and into anyplace in the interior home where there are openings. One of the major offenders of air leakage is around receptacle outlets. An electrical outlet has multiple female sockets or electrical receptacles. To install a receptacle outlet, you must cut a hole in the Sheetrock (or whatever type of interior wall you have) and then install an electrical box (which is not insulated and is porous) and then the receptacle is installed and finally the non-insulated cover is installed over the receptacle to block and protect against the exposed electrical wiring in the box. All of the above processes result in exposure to the exterior walls and the likely event of energy loss (cold air coming into the house from the exterior wall and through the electrical box and outlet as well as around the box where the interior wall was cut to install the electrical box).

The present invention relates generally to an electrical receptacle and face plate outlet covering as an energy saving device by blocking any and all air infiltration from the receptacle area. The cover is made from recyclable plastic and is rectangular in shape, with insulating foam around the edges of the cover. There are sets of three (3) cut-outs or Rule Steel Die Cut slits in the cover, which are matched and accommodated with a normal electrical plug or a plug lock to be plugged into the receptacle outlet. (FIG. 2, 3, 9, 10 shows cut-outs covers and FIG. 6, 7, 11-16 shows Rule Steel Die Cut slits covers)

The uniqueness of this cover design is the insulating foam channel, in which a single piece of foam is held in place by a custom designed compression channel along all the edges of the outlet resulting in no need for adhesives or any other type of fastening method. This custom design ensures an airtight seal for which the properties of the invention rely on. The invented outlet cover is secured without using any fastening mechanism such as screws or glue and does not require the removal of the outlet wall plate (See FIGS. 5A & 5B, FIG. 6-7).

The cover can be designed for different outlets including single gang outlet, double gang outlet, multi-gang outlet, duplex outlet, multi-duplex outlet, etc.

The receptacle cover is made from plastic such as PVC or recyclable plastic such as PET and is rectangular or square in shape with insulating foam around the edges of the cover to block any and all air infiltration from the receptacle area inclusive of the box and the wall cut out. The aforementioned sealing properties are realized by the cover design being such that it covers substantially around the receptacle and existing outlet cover area to ensure there will be no air leakage from the wall area between the receptacle box and wall cut out.

The present invented cover is installed without the need to remove the outlet cover plate and expose the interior wiring (which is a hazard for people to be electrocuted). Such cover is formed so that the interior of the cover provides the force around the edges to apply force to the foam to supply an airtight seal.

Each end of the cover has three (3) cut-outs or slits so that the plug can be plugged into the receptacle (There are two sets of slits to accommodate a receptacle that has two outlets). This invention also provides a plug lock that plugs into one of the outlets in the event you do not need the outlets at some time. The plug lock and/or the electrical plug are what hold the cover into place and provide the force to seal the foam edge against the wall or outlet mounting surface; the cover goes around the receptacle cover plate so that all possible air infiltration will be blocked. The die cut slits in the cover that the plug or plug lock pass through seal against the prongs on either the cover or the plug lock. The foam within and around the cover will not be installed separately, not like others by putting the foam pads into the electrical box after taking off the receptacle cover plate and exposing the electrical wiring.

DETAILED DESCRIPTION OF THE PREFERRED EMBODIMENTS

The present invention is about a cover for an electrical outlet assembly comprising of an electrical outlet having at least one electrical receptacle, where the cover is forced to seal to the surrounding surface of the receptacle and receptacle cover by the insertion of a plug into the receptacle trapping and forcing the cover to deflect causing force around the sealing flange to press and seal to the surrounding surface, receptacle and finish wall plate. Alternatively, to create the same required kinetic energy as described above to seal the cover is by use of the supplied plug lock. Once fully inserted into the receptacle—causing zero clearance between the plug lock and the receptacle, the cover will seal to the surface as outlined above using the plug lock. The energy needed to seal the cover is stored in the plastic cover itself as potential energy. Since energy cannot be created or destroyed, this energy cannot disappear. Instead, it is stored as potential energy in the cover to be used over and over again. If the plug is removed and the cover released, this stored energy will be converted into kinetic energy by the restoring force, which is elasticity in the case of this plastic cover design.

This designed cover secures the violation of penetration of the inside portion of an outside wall of a dwelling from air infiltration and thus save energy as it keeps heated air from escaping and cold air from entering during the winter months and heated air from infiltrating and cold air from escaping in the summer months.

Normally, this invented cover consists of a cover with two sets of electric socket cut-outs or die cut slits matching the configuration of a duplex outlet and has an airtight seal around the perimeter that is urged against the wall surface as to seal the entire electric outlet installation and wall penetration against transient air flow and all air born mater as in dust and other types of atomized mater.

This said cover requires no removal of wall plate which would expose the installer to the risk of high voltage. Also, Removal of the installed finish cover plate can be a cause of finished painted or wall paper defacement as the cover plate is unscrewed and removed.

To install this designed cover, it is only required that a plug that is previously inserted into the electric socket be removed momentarily while "the cover" is placed over the existing wall outlet and existing cover plate, align the slits in the cover with the slots on the wall outlet then firmly reinsert the plug device previously removed. The insertion of the plug causes the cover to deform and thus exert pressure to the sealing perimeter therefore forcing the seal to seal against the wall surface.

Figure 1:
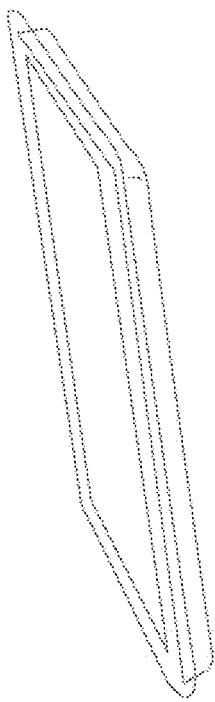
FIG. 1 is a perspective view of an electrical outlet cover with a designed compression channel to fit in one-piece insulating foam around all the edges of the cover.
Figure 2:
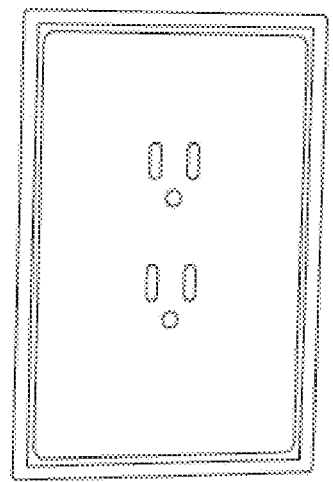
FIG. 2 is a front view of an electrical outlet cover.
Figure 3:
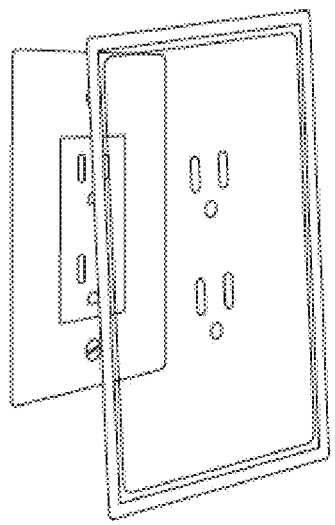
FIG. 3 is a perspective view of an electrical outlet cover with two sets of three (3) cut-outs which are matched and accommodate a normal two prong and three prongs (grounded) electrical plug.
Figure 4:
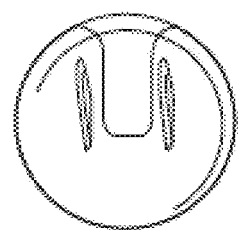
FIG. 4 is a front view of a plug lock.
Figure 5:
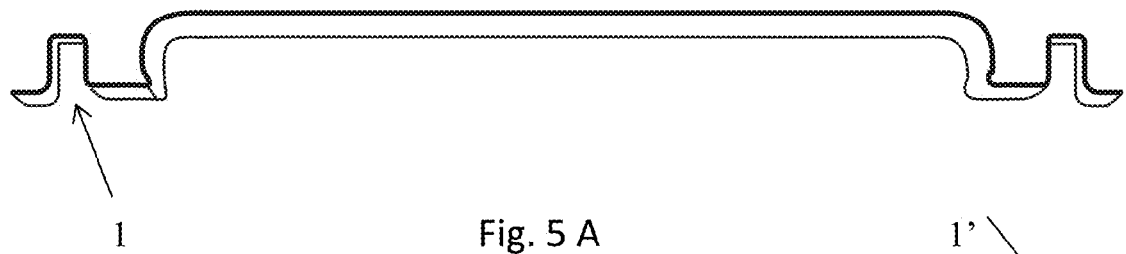
FIGS. 5 A and B are cross-sectional cut side views of an electrical outlet cover to show the designed compression channel for one-piece insulating foam around all the edges of the cover.
Figure 5:
Figure 6:
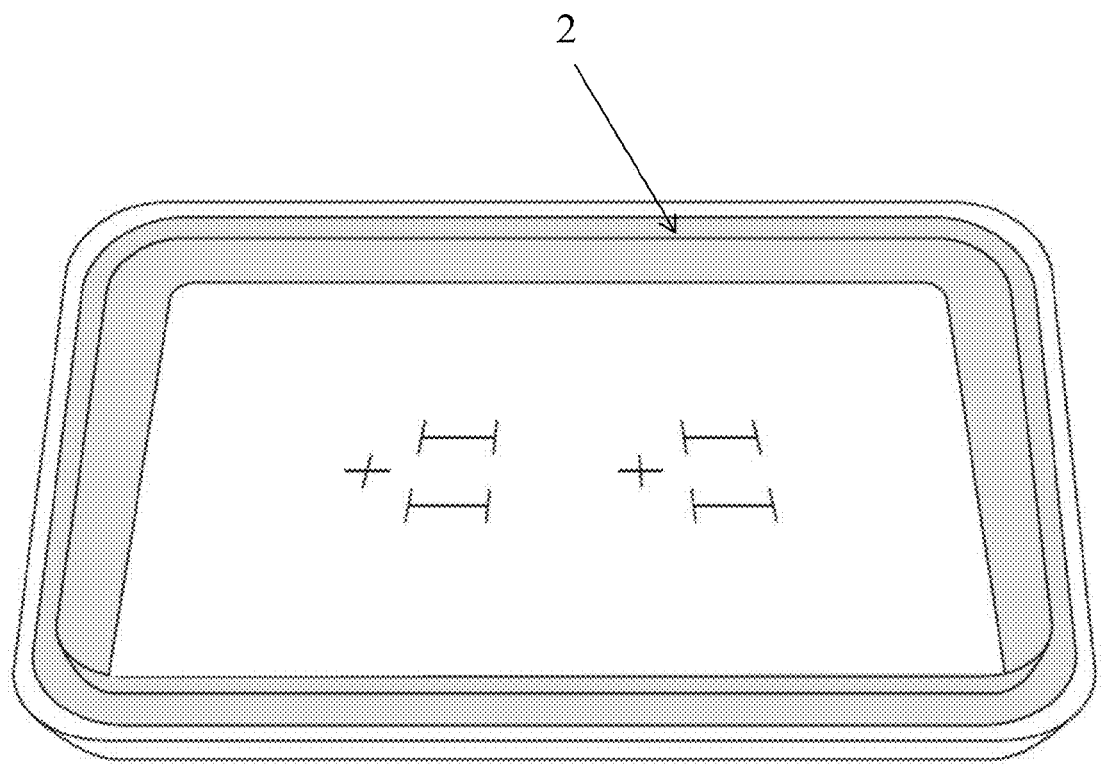
FIG. 6 is a top view of an electrical outlet cover with inserted one-piece insulating foam around all the edges of the cover.
Figure 7:
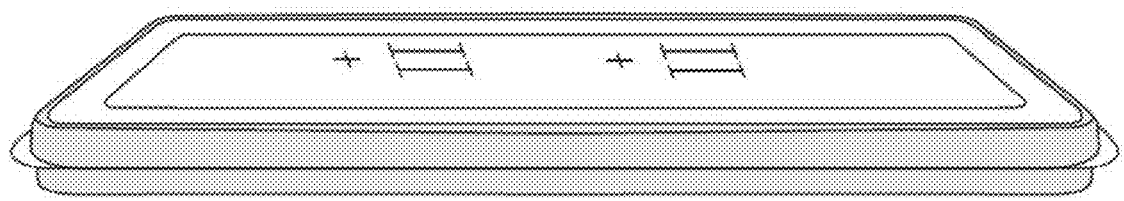
FIG. 7 is a side view of an electrical outlet cover with inserted one-piece insulating foam around all the edges of the cover.
Figure 8:
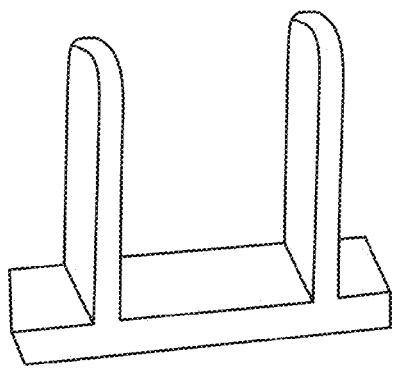
FIG. 8 is a sectional perspective view of plug lock.
Figure 9:
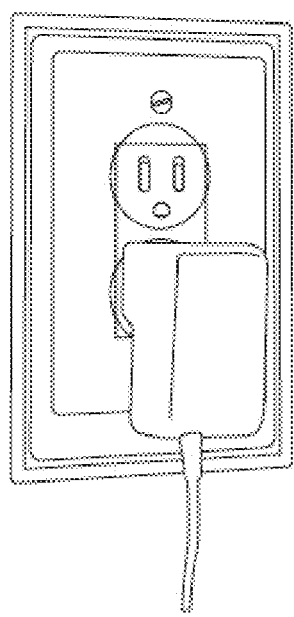
FIG. 9 is a perspective view of an electrical outlet cover with one inserted plug lock and one inserted normal adaptor plug.
Figure 10:
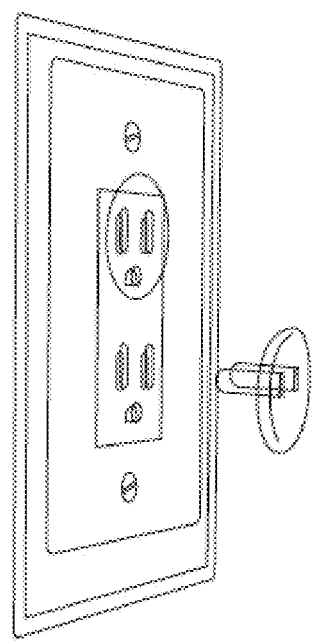
FIG. 10 is a perspective view of an electrical outlet cover with one inserted plug lock and one coming plug lock.
Figure 11:
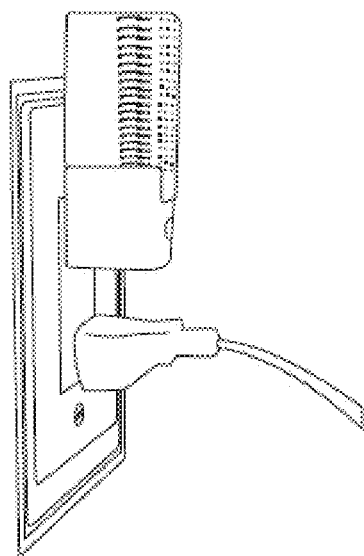
FIG. 11 is a perspective view of an electrical outlet cover with one inserted night light plug and one normal plug.
Figure 12:
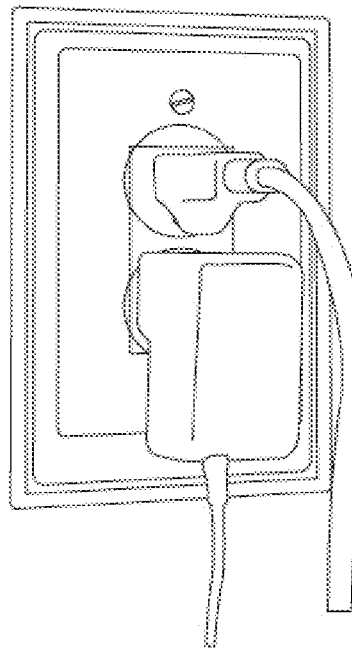
FIG. 12 is a perspective view of an electrical outlet cover with one inserted normal adaptor plug and one inserted normal plug.
Figure 13:
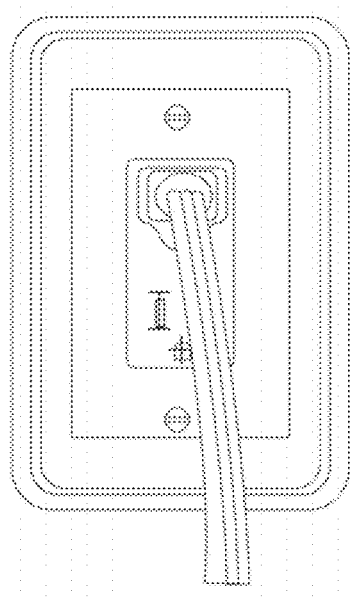
FIG. 13 is a front view of an electrical outlet cover with two sets of three Rule Steel Die Cut slits and inserted with one normal three prongs plug.
Figure 14:
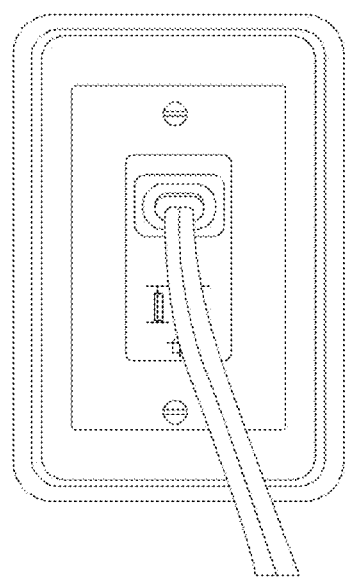
FIG. 14 is a front view of an electrical outlet cover with two sets of three Rule Steel Die Cut slits and inserted with one normal two prongs plug.
Figure 15:
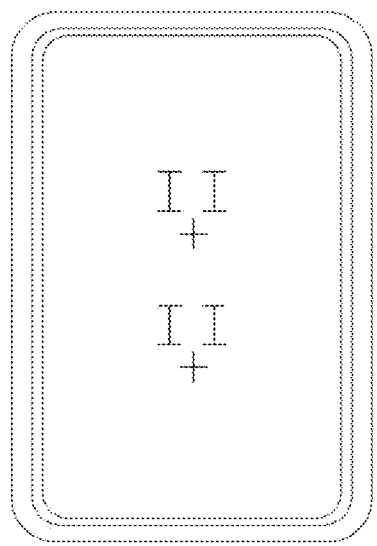
FIG. 15 is a front view of an electrical outlet cover with two sets of three Rule Steel Die Cut slits.
Figure 16:
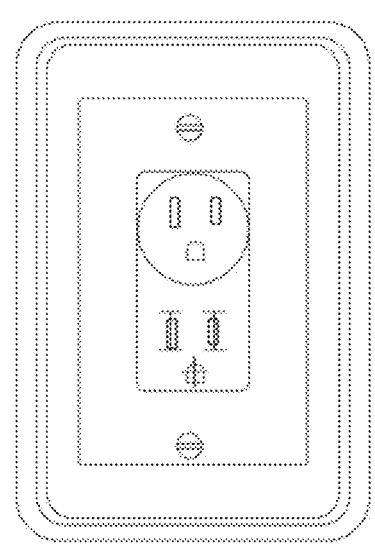
FIG. 16 is a front view of an electrical outlet cover with two sets of three Rule Steel Die Cut slits and inserted with one plug lock.

The uniqueness of this cover design is the foam channel (1 and 1', see FIGS. 5 A & B), in which a single piece of foam (2) in FIG. 6 and FIG. 7 is held in place by a custom designed compression channel (1, 1') along all the edges of the outlet resulting in no need for adhesives or any other type of fastening method.

The said cover could be made from other durable materials except plastic. Also, it could be manufactured in different sizes and shapes according to customer's tastes as long as it will cover all the area of the outlet.

The present invented electrical receptacle outlet cover has the following advantages:

1. Suitable to most of outlets existing in residential and commercial buildings;
2. Easy to install or release without any fastening mechanism;
3. Light weight and inexpensive to manufacture and affordable to all the customers;
4. Not affect the look of the original outlet by using clear or transparent recycled plastic material;
5. Safe and last long;

6. Portable, flexible, and removable;
7. Does not require the use of an adhesive material or tools for mounting;
8. Most importantly, save energy from air infiltration.

In summary, the present invention provides a novel, handy and simple outlet cover which is installed over and around existing electrical outlets and their associated wall plates, which is inexpensive and easy to manufacture. It solves a persistent energy saving problem by blocking the air infiltration through electrical outlets, without damaging the surface it is attached on. Such outlet cover has huge and wide applications in all the residential and commercial buildings.

Although the outlet cover and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. An electrical outlet cover comprises a plastic cover to match the size and shape of an electrical receptacle and face plate outlet, whereas there are sets of three cut-outs or Rule Steel Die Cut slits in said plastic cover which are matched and accommodated with a normal electrical plug, whereas there is an one-piece insulating foam sitting through a compression channel designed around all the edges of said plastic cover;

Where said plastic cover is plugged into an electrical outlet by the insertion of a plug into an electrical receptacle to hold the said plastic cover in place in an airtight configuration;

Where said plastic cover is an energy saving device to block any and all air infiltration from the receptacle area;

Where said insulating foam is an airtight seal;

Where said plastic cover is rectangular or square in shape to match the size and shape of an electrical receptacle and face plate outlet;

Where said plastic cover is made from plastic including PVC or recyclable plastic including PET;

Where said plastic cover is made from clear or transparent plastic;

Where said plastic cover is held into an outlet by plugging a plug lock into said outlet;

Where said plastic cover is installed by aligning said cut-outs or said slits and inserting a plug or a plug lock that is previously inserted into an electric socket and is removed momentarily while said plastic cover is placed over an existing wall outlet or existing cover plate;

Where said plastic cover is uninstalled by unplugging a plug or a plug lock.

* * * * *